(No Model.)
J. R. BIRD.
HORSE DETACHER.
No. 340,973. Patented May 4, 1886.
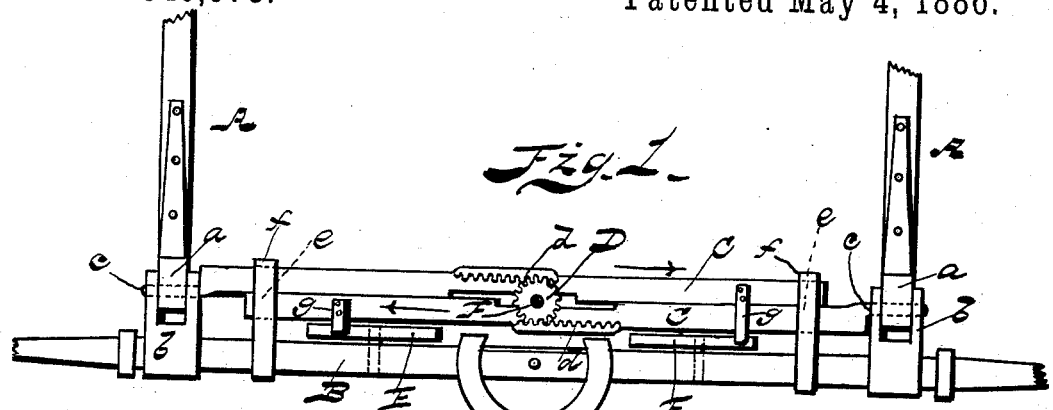
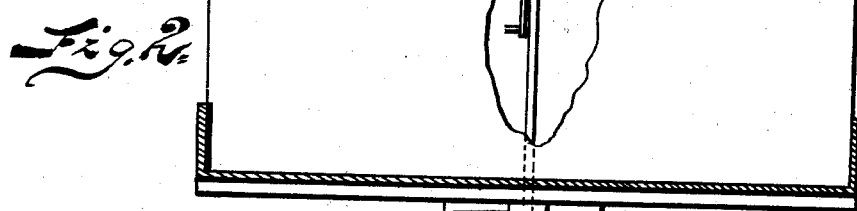
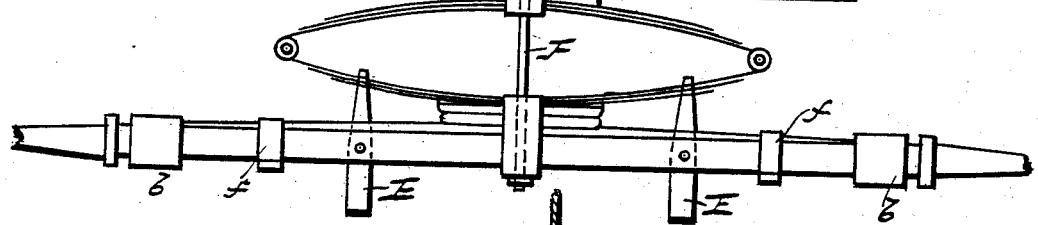
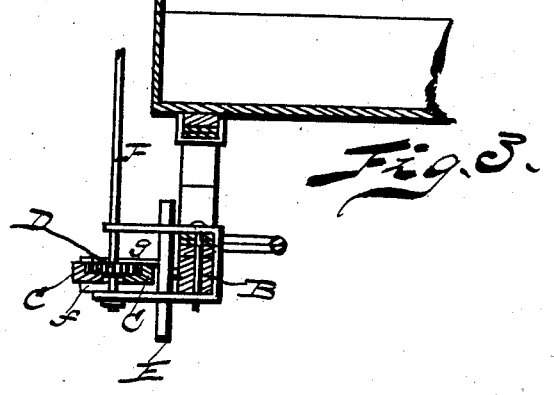
WITNESSES
M. A. Bates
Blair Read
INVENTOR
J. R. Bird
by E. K. Bates
Attorney
N. PETERS, Photo-Lithographer, Washington, D. C.

United States Patent Office.

JAMES R. BIRD, OF BROOKLYN, NEW YORK, ASSIGNOR OF ONE-HALF TO THOMAS C. HOGE, OF SAME PLACE.

HORSE-DETACHER.

SPECIFICATION forming part of Letters Patent No. 340,973, dated May 4, 1886.

Application filed February 23, 1886. Serial No. 192,931. (No model.)

*To all whom it may concern:*

Be it known that I, JAMES R. BIRD, a citizen of the United States, residing at Brooklyn, in the county of Kings, State of New York, have invented certain new and useful Improvements in Horse-Detachers, of which the following is a specification, reference being had therein to the accompanying drawings.

This invention has relation to improvements in devices for detaching horses from vehicles; and it consists in the novel construction and arrangement of devices hereinafter fully described, by means of which the shafts or pole of the vehicle can be readily disengaged from the front axle by the driver without leaving his seat, and at the same time the front axle is prevented from turning by devices operating automatically in connection and simultaneously with the releasing devices.

The annexed drawings, to which reference is made, fully illustrate my invention, in which Figure 1 represents a plan view of my device. Fig. 2 is a rear view of a front axle, showing my improvement, the body of the vehicle in cross-section. Fig. 3 is a vertical sectional view, and Fig. 4 is a detail view of one of the slotted arms *f*.

Referring by letter to the accompanying drawings, A designates the shafts or a pole of a vehicle, having the usual eyes, *a a*, which are coupled to the clips *b b* on the axle B.

C C indicate twin transverse bars arranged in front of the axle and between the ends of the shafts, which bars are each provided at one end with a coupling pin or bolt, *c c*, which connect the thill-eyes to the clips. About the center of these bars, and secured thereto or a part thereof, are rack-bars *d d*, between which is located a horizontal pinion, D, the teeth of which engage said rack-bars and serve to withdraw the pins or bolts from the coupling-eyes, as will be further explained hereinafter.

The bars C C slide transversely through slots *e e*, formed in short bars *f f*, secured to the front axle, which short bars also support said transverse sliding bars and retain them in position.

Between the axle and the adjoining transverse sliding bar aforesaid are arranged two weighted bars or dogs, E E, which are pivoted to said axle, and are held in their normal position (which is horizontal) by means of two short arms, *g g*, which are arranged to one side of the pivotal point of said dogs, and are each secured to the front and rear transversely sliding bars, as shown in Fig. 1 of the drawings.

F represents a rod rising vertically in front of the dash-board of the vehicle, on the lower end of which is secured the operating-pinion aforesaid, and the same is secured at its lower end to suitable bearing-plates secured to said axle, and the upper end thereof is provided with a hinged crank-handle, which, when in its normal position, lies parallel with the vertical pinion-rod; but when in use in releasing the shafts from the vehicle the operator throws it into a horizontal position, as shown by the dotted lines, Fig. 2, thus serving as a crank, by means of which the vertical rod, with its pinion, is revolved, thereby withdrawing the coupling pins or bolts from the thill-eyes and instantly releasing the shafts from the axle.

It will thus be seen by the above description, and by reference to the annexed drawings, that when the operating parts are in their normal position the pins or bolts are inserted into the thill-eyes and axle-clips, thus firmly securing the thill to said axle. At the same time the pivoted arms or dogs lie in a horizontal position, and are held therein by the short pieces secured to the transverse bars, and the hinged crank-handle lies vertical with the pinion-operating rod, thereby being out of the driver's way when not in use.

The operation of my device in detaching the animal, with its shafts or thills, from the vehicle is as follows: The driver simply raises the crank-handle to a horizontal position, and turning the same to the right-hand side, thus turning the rod, thereby imparting a revolution to the pinion on the lower end thereof, which latter, meshing with the racks on the transverse bars, causes the same to slide laterally in opposite directions through the slots in the extended arms by which said bars C C are supported, and withdrawing the end pins or bolts from engagement with the thill-coupling, thus releasing the thills from the vehicle. Simultaneously with this operation of the sliding bars—*i. e.*, the instant the thill-bolts are withdrawn from the thill-eyes—the pivoted arms or dogs come into operation, This is caused in the following manner: When the sliding bars carrying the holding arms or pieces are sufficiently laterally moved, the arms or holding-pieces clear the pivoted dogs and permit them to swing on their pivots and assume a vertical position, as shown in Fig. 2 of the drawings. One end of these dogs is much heavier (or weighted) than the opposite end, and the instant it is released from the holding-piece this weighted end drops, thus throwing up the opposite end, which is long enough to engage the front spring of the vehicle, and thus keep the latter in a straight course after the shafts have been detached, thereby preventing the front wheels from going to the right or left and upsetting the vehicle.

It will be further observed that my device can be readily attached to vehicles now in use, and will be found a valuable addition thereto. In case the animal is unmanageable, the driver can readily detach him, with the thills, and it is simple in operation, not liable to get out of order, and at the same time cheap to manufacture.

Having described my invention, what I claim, and desire to secure by Letters Patent, is—

1. The herein-described horse-detacher, consisting of the twin bars provided with the racks and coupling bolts or pins, the pinion engaging said racks and secured to the vertical rod having the hinged crank-handle, the slotted supporting-arms secured to the axle, the whole adapted to operate as and for the purpose specified.

2. In a horse-detacher, a locking device, substantially as shown, arranged in proper relation to the front axle, whereby said axle is secured and prevented from turning after the animal is released from the vehicle.

3. In a horse-detacher, the combination of the sliding rack-bars provided with the releasing-arms, the slotted supporting-arms secured to the axle, and the pivoted locking-dogs.

4. In a horse-detacher, the combination, with the sliding bars and pinion, of the pivoted dogs adapted to operate automatically in locking the front axle after the animal has been released, substantially as described.

In testimony whereof I affix my signature in presence of two witnesses.

JAMES R. BIRD.

Witnesses:
EDWARD TAYLOR,
CYRUS D. REID.